United States Patent

Minter et al.

[11] Patent Number: 6,039,915
[45] Date of Patent: Mar. 21, 2000

[54] BURN TABLE

[75] Inventors: Larry L. Minter, Jefferson, S. Dak.;
Greg L. Parham, Sioux City, Iowa

[73] Assignee: Missouri Valley Steel Company, Sioux City, Iowa

[21] Appl. No.: 09/064,968

[22] Filed: Apr. 23, 1998

[51] Int. Cl.⁷ .................................................. B23K 7/08
[52] U.S. Cl. ............................ 266/49; 266/65; 266/135
[58] Field of Search .............................. 266/48, 49, 65, 266/135

[56] References Cited

U.S. PATENT DOCUMENTS

| | | | |
|---|---|---|---|
| 3,526,395 | 9/1970 | Brown | 263/45 |
| 3,610,603 | 10/1971 | Schmitz | 266/37 |
| 3,666,249 | 5/1972 | MacLeod, Jr. | 263/45 |
| 3,736,615 | 6/1973 | Kumaki | 15/104.1 |
| 3,770,110 | 11/1973 | Boskovitch | 198/220 |
| 3,784,176 | 1/1974 | Walters et al. | 266/48 |
| 3,792,846 | 2/1974 | Geffert | 266/23 F |
| 3,999,744 | 12/1976 | Kotch | 266/48 |
| 4,058,299 | 11/1977 | Lindkvist | 266/48 |
| 4,220,318 | 9/1980 | Anderson et al. | 266/49 |
| 4,390,167 | 6/1983 | Ito et al. | 266/48 |
| 4,453,702 | 6/1984 | Anderson et al. | 266/49 |
| 4,615,510 | 10/1986 | Lehmler et al. | 266/48 |
| 4,887,797 | 12/1989 | Karow | 266/49 |
| 4,930,756 | 6/1990 | Brenneke | 266/65 |

*Primary Examiner*—Scott Kastler
*Attorney, Agent, or Firm*—Koley, Jessen, Daubman & Rupiper, P.C.; Mark D. Frederiksen

[57] ABSTRACT

A burn table includes a slag removal apparatus operably mounted beneath the flame cutting table and between a pair of spaced apart vertical panels which support the flame cutting table. The slag removal apparatus includes a blade mounted on a support frame, the support frame extending between the vertical panels and moveable between the panels from one end of the burn table to the other. A drive motor is mounted on the frame to drive the frame forwardly and rearwardly, and thereby push the blade along the floor to scrape slag from the floor.

26 Claims, 5 Drawing Sheets

BURN TABLE

TECHNICAL FIELD

The present invention relates generally to burn tables, and more particularly to an improved burn table having a slag removal system.

BACKGROUND OF THE INVENTION

Burn tables are generally horizontal work tables formed of a plurality of spaced apart slats upon which a metal plate or sheet is supported while a gas cutting torch cuts out predetermined shapes. Typically, the cutting is repeated in an automatic sequence, and follows a predetermined pattern or template.

During the cutting operation, slag will drop between the slats to the floor. Typically, the slag is permitted to accumulate until it interferes with the cutting process, or there is a planned "down time". Since the burn table is not easily moved, it is necessary to first remove a section of slats, and then enter the burn table with a pick or similar tool to loosen and remove the slag buildup.

SUMMARY OF THE INVENTION

It is therefore a general object of the present invention to provide an improved burn table with a slag removal apparatus.

Another object is to provide a burn table with a slag removal apparatus which may be operated without removing the slats from the burn table.

A further object of the present invention is to provide a burn table with slag removing apparatus which is simple to operate, economical to manufacture and provides great scrapping force to remove slag buildup on the floor.

These and other objects of the present invention will be apparent to those skilled in the art.

The burn table of the present invention includes a slag removal apparatus operably mounted beneath the flame cutting table and between a pair of spaced apart vertical panels which support the flame cutting table. The slag removal apparatus includes a blade mounted on a support frame, the support frame extending between the vertical panels and moveable between the panels from one end of the burn table to the other. A drive motor is mounted on the frame to drive the frame forwardly and rearwardly, and thereby push the blade along the floor to scrape slag from the floor.

DESCRIPTION OF THE PREFERRED EMBODIMENT

Figure 1:
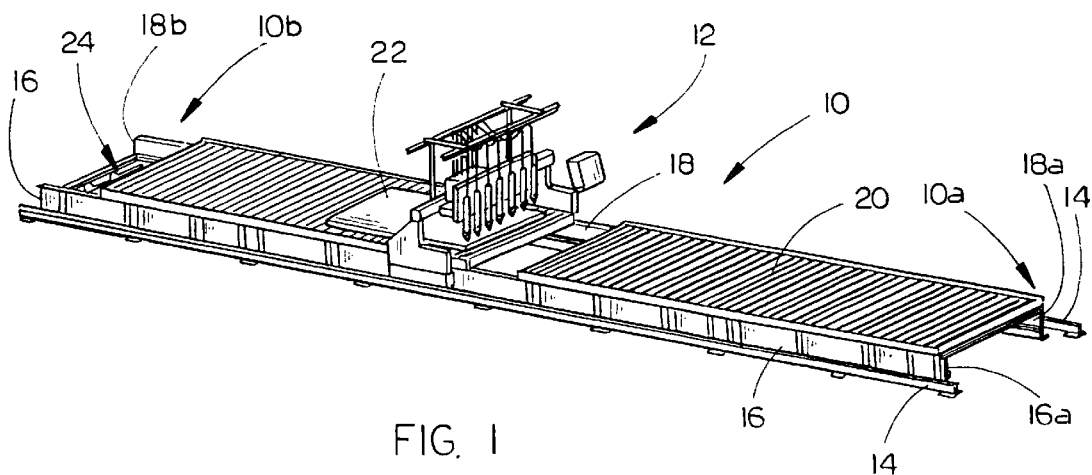
FIG. 1 is a perspective view of the burn table of the present invention.

Referring now to the drawings, in which similar or corresponding parts are identified with the same reference numeral, and more particularly to FIG. 1, the burn table of the present invention is designated generally at 10 and includes a cutting apparatus 12 of a conventional variety, supported on a pair of parallel rails 14 which extend the length of burn table 10. Burn table 10 is formed from a pair of parallel vertical panels, extending horizontally from a forward end 16a and 18a to a rearward end 16b and 18b respectively. A plurality of vertically oriented parallel spaced apart slats 20 extend transversely between panels 16 and 18 from the forward ends to the rearward ends, to form a horizontal table upon which a metal sheet 22 of work material is supported, to be cut by cutting apparatus 12. For ease of description, burn table 10 will be defined as having a forward end 10a and a rearward end 10b, throughout the specification.

Figure 2:
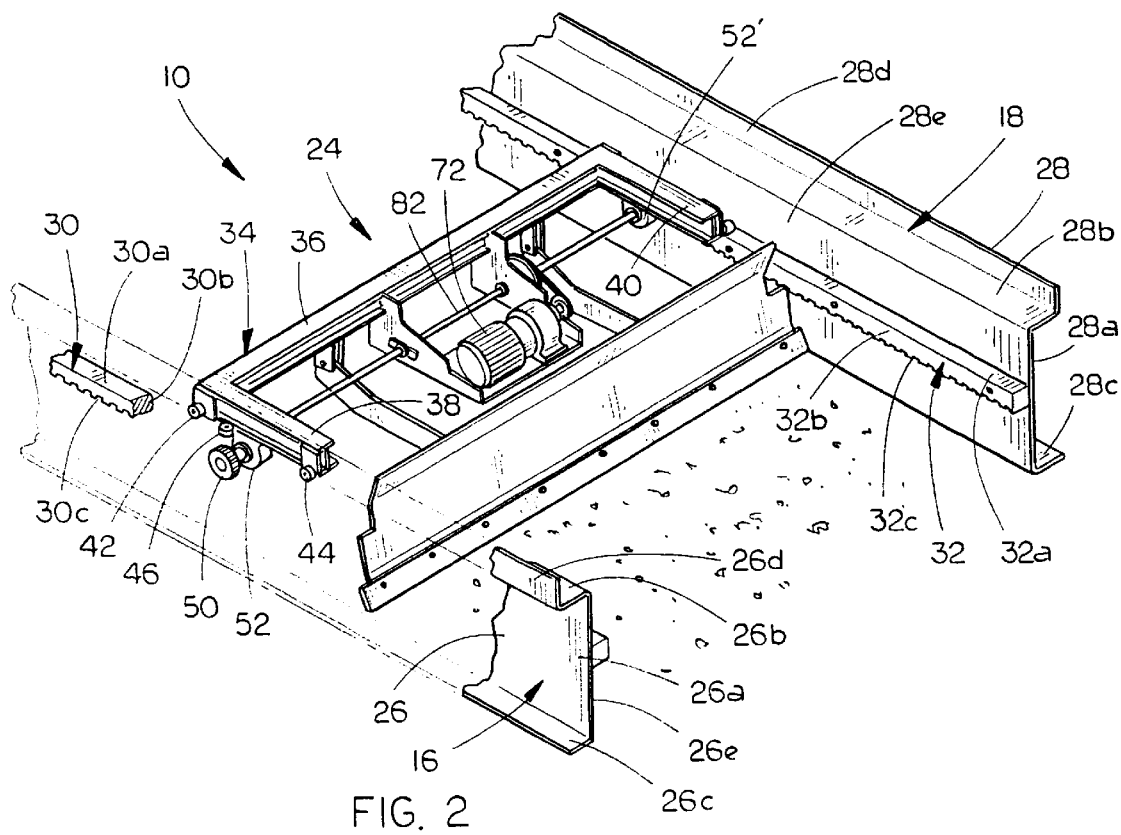
FIG. 2 is an enlarged perspective view of the slag removal apparatus mounted between the side panels of the burn table.

Referring now to FIG. 2, the slats 20 have been removed from the burn table 10 to show the slag removal apparatus 24 in more detail. Burn table panel 16 is a generally C-shaped channel 26 having a vertically oriented web 26a, and outwardly extending upper and lower legs 26b and 26c respectively. A vertical flange 26d is provided along the length of the outer edge of upper leg 26b, to retain a slat 20 in position on channel upper leg 26b.

Panel 18 is a similarly shaped channel 28 with a web 28a, upper and lower legs 28b and 28c, and an upwardly projecting flange 28d, the same as channel 26. Channel 28 is oriented with legs 28b and 28c projecting outwardly from the web 28a, such that flanges 26b and 28b retain the slats 20 therebetween supported on the channel legs 26b and 28b respectively.

Each channel web 26a and 28a has an inward face 26e and 28e respectively, upon which an elongated guide rail 30 and 32 is mounted respectively. Guide rails 30 and 32 are preferably mounted generally centrally between the upper and lower channel legs, and extend the length of each channel 26 and 28. Slag removal apparatus 24 is guided by guide rails 30 and 32 to move along the entire length of burn table 10, from the rearward end 10b to the forward end 10a and back to the rearward end 10b (as shown in FIG. 1).

Slag removal apparatus 24 includes a generally U-shaped frame 34 having a base member 36 extending transversely between channels 26 and 28, and forwardly projecting leg members 38 and 40 on the ends of base member 36. Leg members 38 and 40 extend a distance to resist binding of the frame between channels 26 and 28 as the slag removal apparatus 24 is moved the length of burn table 10.

Figure 3:
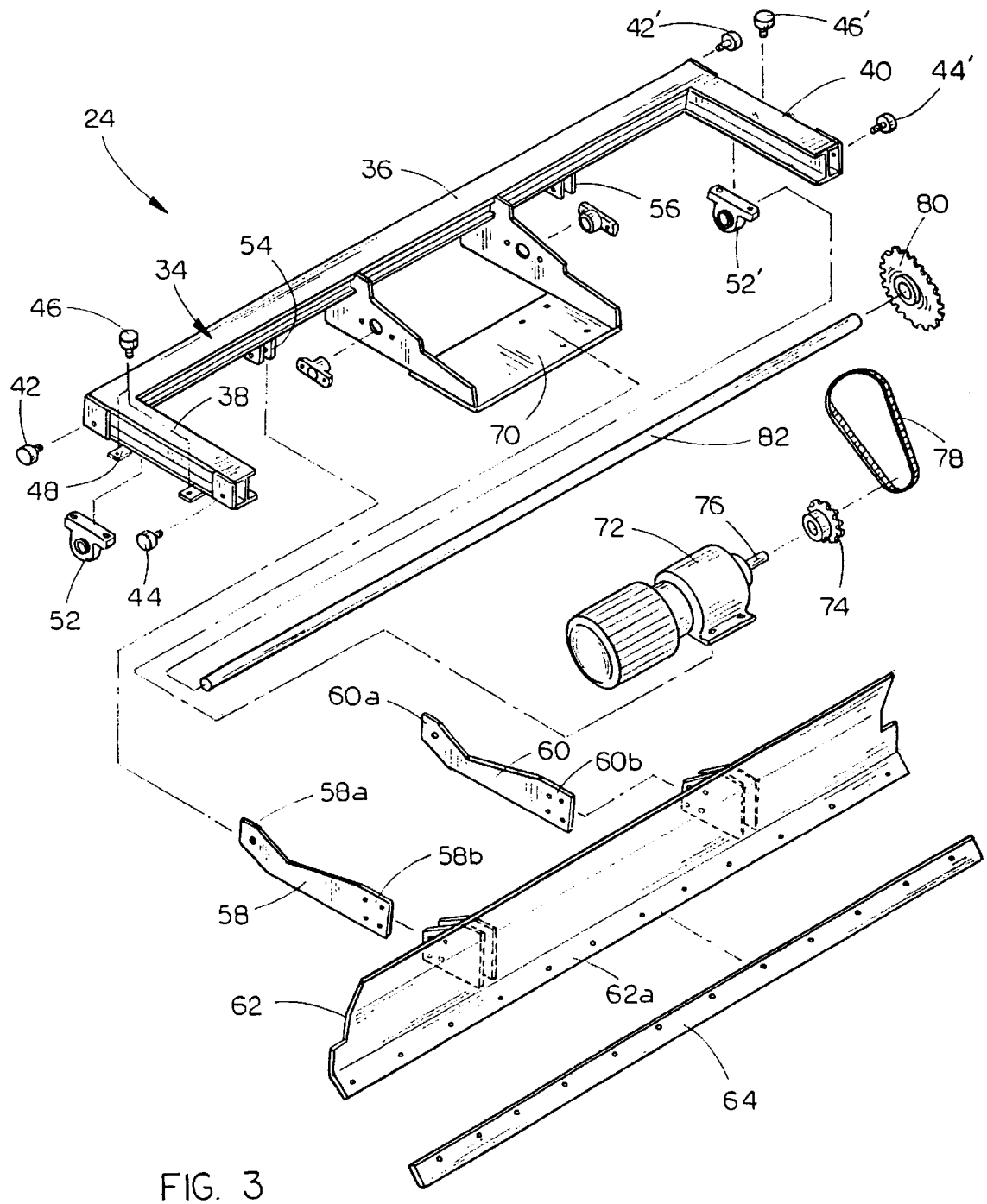
FIG. 3 is an exploded perspective view of the slag removal apparatus for the burn table.

Referring now to FIG. 3, a pair of freely rotatable wheels 42 and 44 are mounted to the rearward and forward ends of leg member 38, on the exterior thereof, with their rotational axes orthogonal to the longitudinal axis of guide rail 30 (shown in FIG. 2). Thus, wheels 42 and 44 will engage and roll upon the upper longitudinal surface 30a of guide rail 30. A pair of similar wheels 42' and 44' are rotatably mounted on the rearward and forward ends of leg member 40 to engage the upper surface 32a of guide rail 32, in a similar fashion. A third wheel 46 is rotatably mounted on a vertical axis on a tab 48 projecting outwardly from the leg member 38, to engage the inward longitudinal face 30b of guide rail 30 (shown in FIG. 2). A similar third wheel 46' is mounted on leg member 40 to engage the opposing guide rail inward face 32b.

A fourth wheel 50 is rotatably mounted in a bearing 52 on a rotational axis parallel to the axes of wheels 42 and 44, but located below wheels 42 and 44, so as to engage the lower longitudinal surface 30c of guide rail 30. A similar wheel 50' on a bearing 52' engages the lower surface 32c of the opposing guide rail 32.

In this fashion, forward and rearward guide wheels 42 and 44 work in association with the fourth lower wheel 50 to maintain leg member 38 from vertical movement off of guide rail 30. Similarly, wheels 42', 44' and 50' maintain leg member 40 on guide rail 32. Simultaneously, wheels 46 and 46' prevent transverse movement of frame 34 between guide rails 30 and 32. The system of four engagement wheels 42', 44, 46, and 50 on leg member 38, and wheels 42', 44', 46', and 50' on leg member 40 serve to maintain frame 34 in aligned engagement with guide rails 30 and 32, so that slag removal apparatus 24 will move forwardly and rearwardly between panels 16 and 18 without binding.

Referring once again to FIG. 3, frame base member 36 has a pair of brackets 54 and 56 depending from the lower surface thereof, and spaced apart from one another. An elongated push arm 58 is pivotally connected at its rearward end 58a to bracket 54. A second push arm 60 is pivotally connected at its rearward end 60a to bracket 56. The pivotal axes of push arms 58 and 60 are preferably coaxial and oriented horizontal and parallel to frame base member 36, to permit vertical pivotal movement of the forward ends 58b and 60b of push arms 58 and 60. A scraper blade 62 is rigidly secured to the forward ends of push arms 58 and 60, for pivotal movement along with push arms 58 and 60. Blade 62 is preferably generally vertically oriented, with a horizontally extending lower portion 62a bent forwardly at an angle relative to vertical. An elongated wear plate 64 is affixed to lower portion 62a of blade 62, to contact the floor surface and scrape slag 66 therefrom, as shown in FIG. 3. It can be seen that the angle of lower portion 62a and wear plate 64 will serve to pry slag 66 upwardly off of the floor 68 as the blade is moved forwardly. In addition, the use of elongated push arms 58 and 60 (shown in FIG. 3) to push blade 62 will provide both a horizontal and downward vertical vector to the pushing force on the blade 62, to thereby increase the scraping efficiency of the blade.

A platform 70 mounted on the frame base member 36 will support a motor 72 which is used to drive the slag removal apparatus 24. A sprocket 74 on the drive shaft 76 of motor 72 engages an endless loop chain 78 which will rotate a drive sprocket 80 on axle 82, to thereby rotate axle 82. As shown in FIG. 2, axle 82 has wheels 50 and 50' mounted on the opposing ends thereof, and engaged on axle 82 to rotate with the rotation of axle 82. Wheels 50 and 50' are preferably formed with teeth to act as gears, and the lower surfaces 30c and 32c of guide rails 30 and 32 are preferably formed with corresponding teeth to form racks which will be engaged by gears 50 and 50'. Thus, motor 72 will rotate axle 82 and drive the slag removal apparatus 24 either forwardly or rearwardly, as desired.

Figure 4:
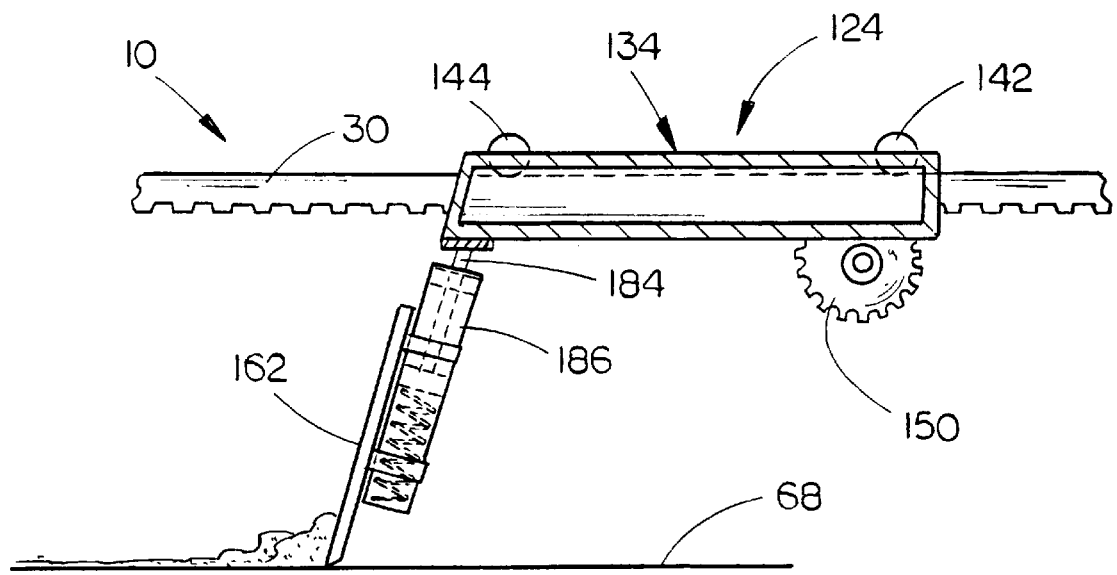
FIG. 4 is a vertical sectional view through a second embodiment of a slag removal apparatus.

Referring now to FIG. 4, a second embodiment of the slag removal apparatus is designated generally at 124 and moves along the guide rails 30 and 32 of the burn table 10 to scrape slag from floor 68. Slag removal apparatus 124 includes a rigid frame 134 extending between the guide rails 30 and 32. A pair of upper guide wheels 142 and 144, and a lower drive wheel/gear 150 are mounted at the opposing ends of frame 134 to drive the slag removal apparatus 124 along guide rails 30 and 32 in the same fashion as the previous embodiment of the invention.

Figure 5:
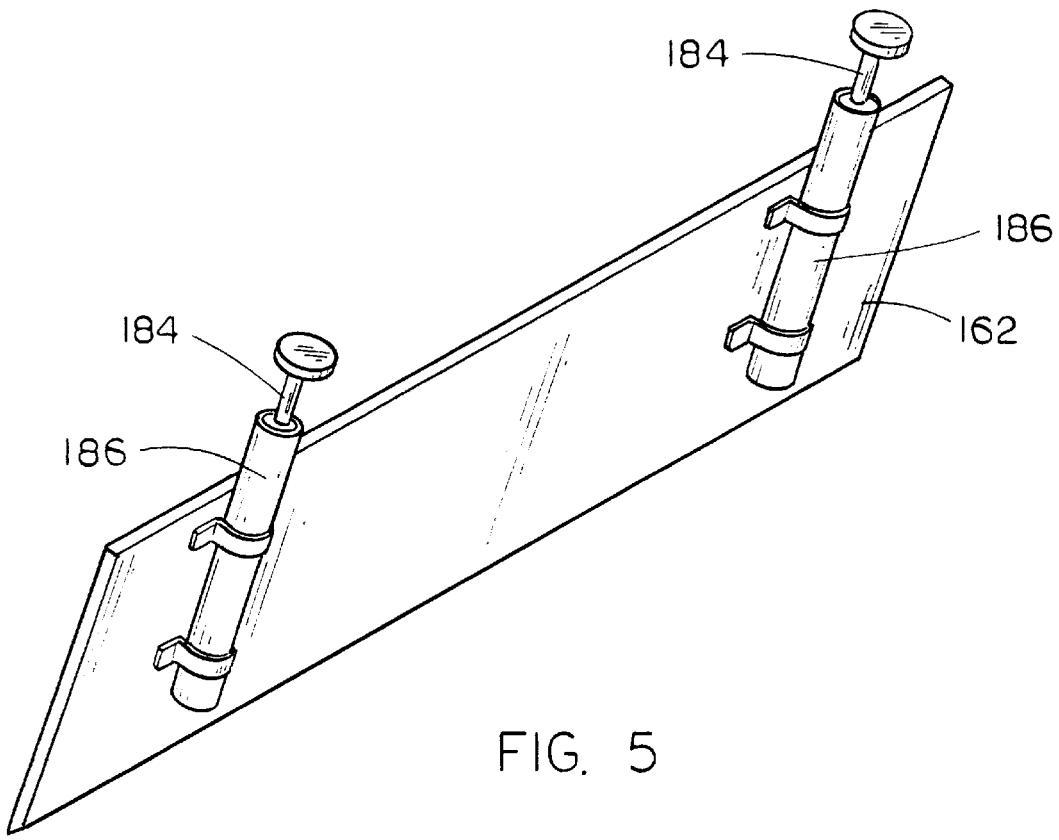
FIG. 5 is an enlarged perspective view of the scraper blade of the slag removal apparatus of FIG. 4.

Referring now to FIG. 5, the scraper blade 162 of this second embodiment of the invention has a pair of spring loaded pistons 184 operably mounted within associated cylinders 186 on the back of blade 162. The upper ends of pistons 184 are affixed to frame 134, the pistons biasing blade 162 downwardly into contact with floor 68.

Figure 6:
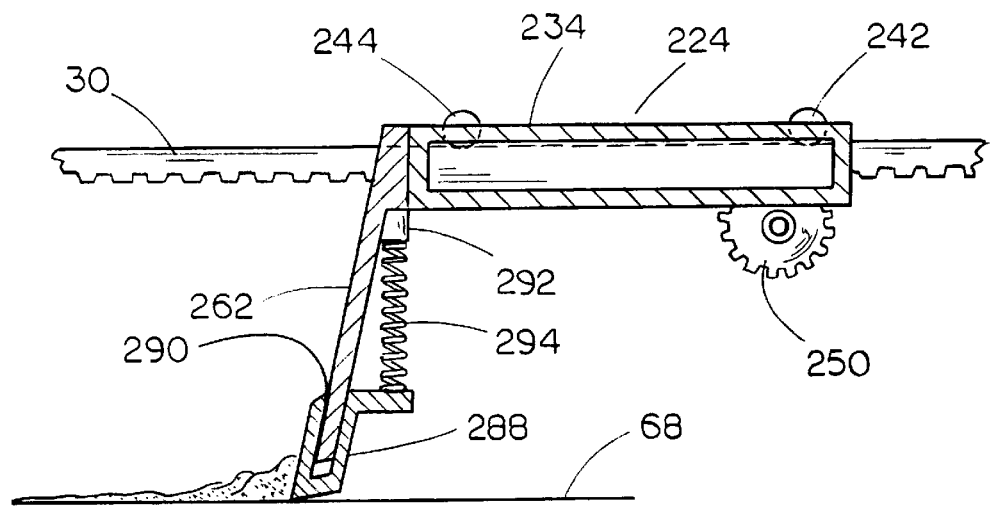
FIG. 6 is a vertical sectional view through a third embodiment of the invention.

Referring now to FIG. 6, a third embodiment of the slag removal apparatus is designated generally at 224 and utilizes the same frame 234, guide wheels 242 and 244 and drive wheel 250 as the second embodiment of the invention. Slag removal apparatus 224 will be moved along guide rails 30 and 32 in the same fashion as the first two embodiments of the invention.

In this third embodiment of the invention, blade 262 is rigidly affixed along a forward edge of frame 234, and depends downwardly therefrom and projects slightly forwardly from frame 234. A scraper plate 288 has a length greater than the length of the blade, and a pocket 290 formed along the upper edge thereof, to receive the lower edge of blade 262 within pocket 290. Blade 262 is slidably mounted within the pocket 290 of plate 288 to permit vertical slidable adjustment of the plate on blade 262.

Figure 7:
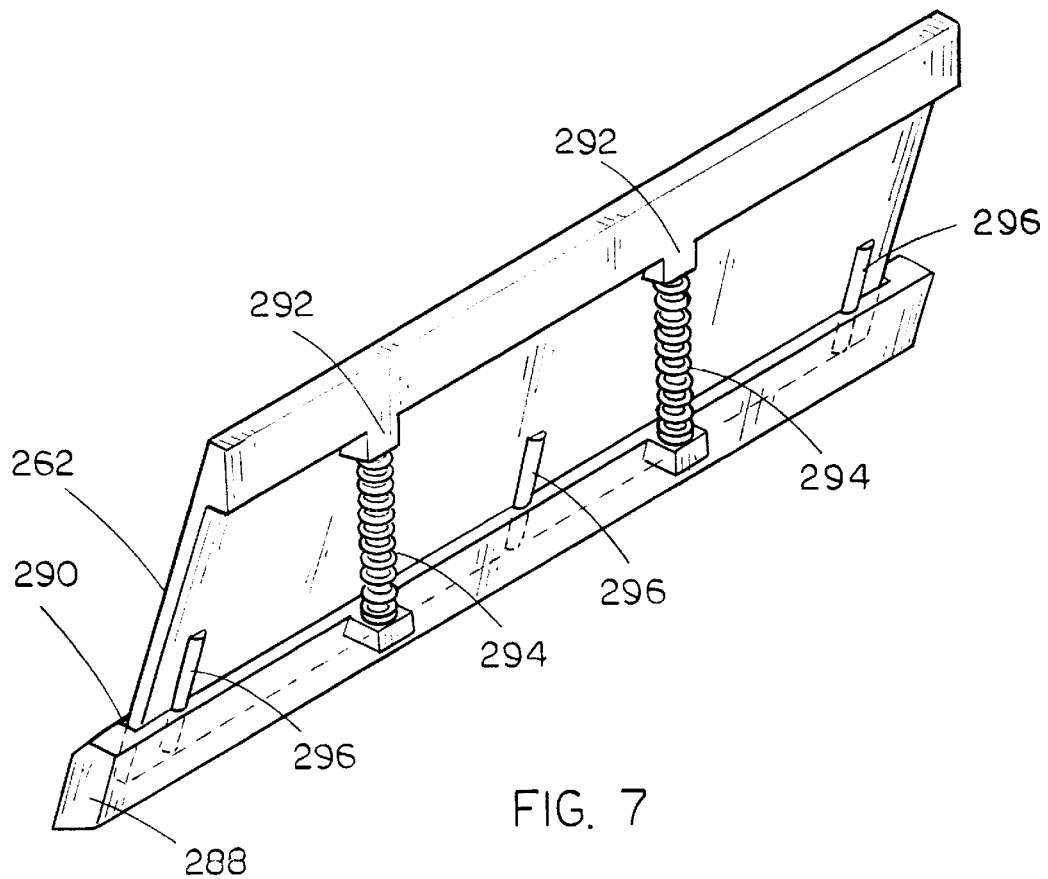
FIG. 7 is an enlarged perspective view of the scraper blade of the embodiment of FIG. 6.

Referring now to FIG. 7, it can be seen that a pair of rearwardly projecting brackets 292 are mounted on the rearward surface of blade 262, and have springs 294 extending downwardly therefrom so as to contact an upper edge of plate 288. Springs 294 thereby bias plate 288 downwardly into contact with floor 68. A plurality of guide rods 296 are also mounted on the back of blade 262 to maintain the scraper plate 288 in vertical alignment as it slides vertically on blade 262.

Figure 8:
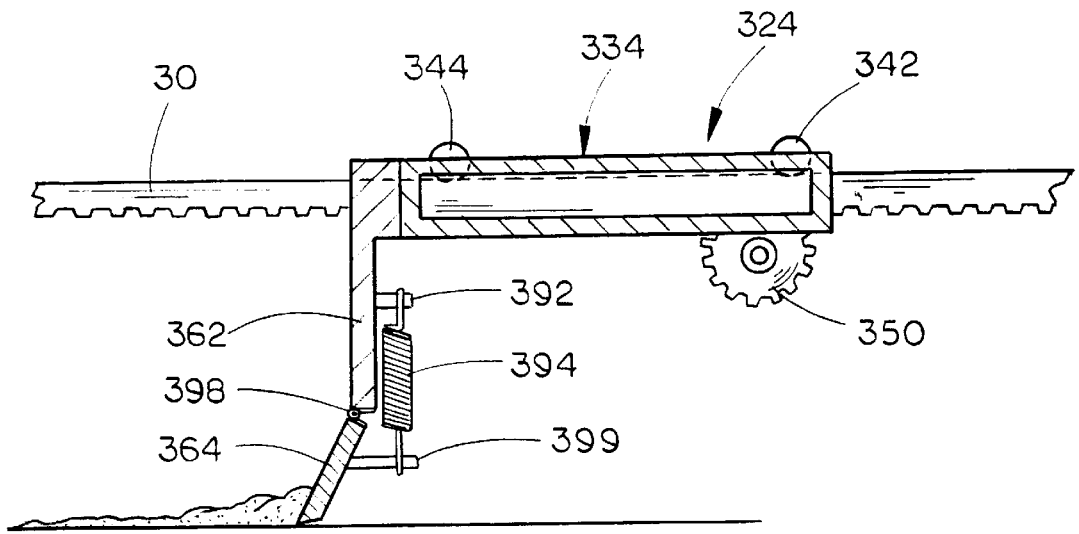
FIG. 8 is a sectional view through a fourth embodiment of the invention.

Referring now to FIG. 8, a fourth embodiment of the invention is designated generally at 324 and includes the same frame 334, guide wheels 342 and 344, and drive wheel 350 as the second and third embodiments of the invention. Slag removal apparatus 324 will again be driven along guide rails 30 and 32, in the same fashion as the previous embodiments.

Figure 9:
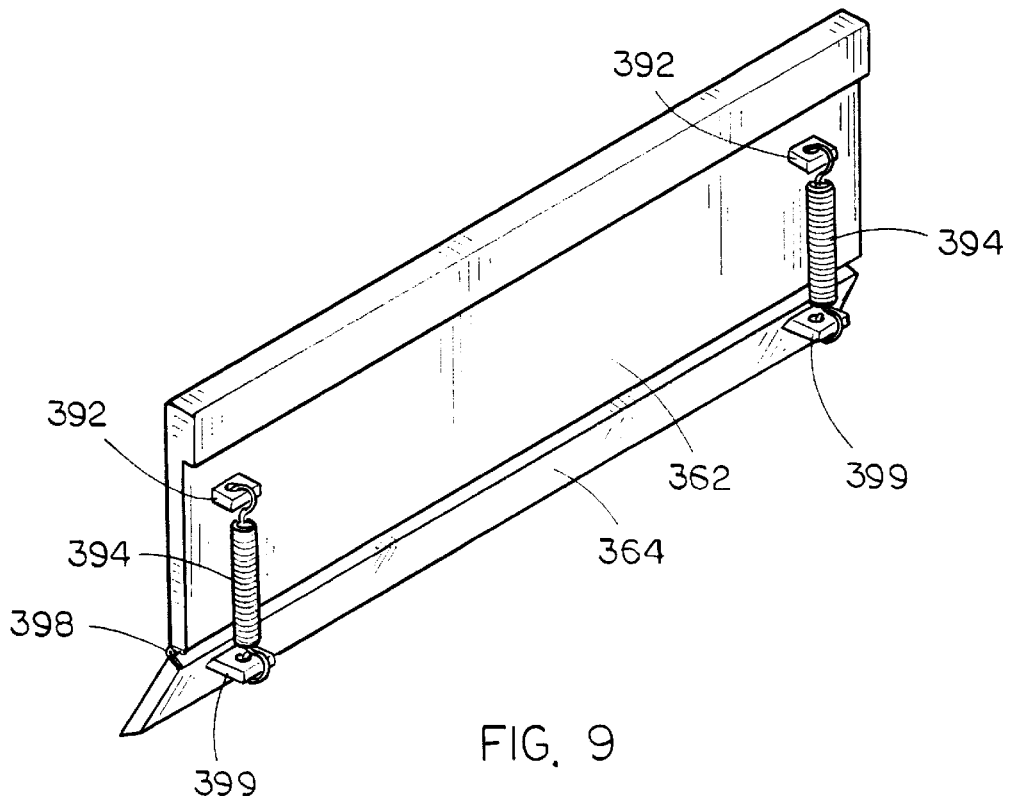
FIG. 9 is an enlarged perspective view of the scraper blade of the embodiment of FIG. 8.

In this fourth embodiment of the invention, blade 362 is rigidly mounted on a forward edge of frame 334, and depends therefrom. A wear plate 364 is pivotally mounted along a hinge 398 along the lower edge of blade 362. Wear plate 364 projects forwardly and downwardly from the lower edge of blade 362, as shown in FIG. 8. A pair of brackets 392 are mounted on the rearward surface of blade 362, and have springs 394 projecting downwardly therefrom, as shown in FIGS. 8 and 9. A pair of lower brackets 399 are mounted on a back surface of wear plate 364, and are connected to the lower end of springs 394. It should be noted that springs 394 are torsional springs, thereby pulling wear plate 364 downwardly and rearwardly by applying a pulling force between upper and lower brackets 392 and 399.

Whereas the invention has been shown and described in connection with the preferred embodiment thereof, many modifications, substitutions and additions may be made which are within the intended broad scope of the appended claims.

What is claimed is:

1. Apparatus for removing slag from beneath a flame cutting table, the table having a pair of parallel, spaced apart vertical panels extending horizontally from a forward end to a rearward end, with a plurality of spaced apart slats mounted transversely along upper edges of the panels, comprising:
   a generally vertically oriented blade having upper and lower edges, opposing vertical side edges, a forward pushing surface, and a rearward surface, said blade positioned beneath the table slats and between the panels;

drive means connected to the blade for driving the blade between the rearward and forward ends of the table;

a first elongated push arm connected at a forward end to the rearward surface of the blade, and said drive means being connected to a rearward end of the push arm;

said drive means being mounted on a support frame, and the rearward end of the push arm being pivotally connected to the support frame for pivotal movement about a pivot axis parallel to the blade and orthogonal to the panels;

a second push arm connected at a forward end to the blade and pivotally connected at a rearward end to the support frame, said second push arm parallel and spaced apart from the first push arm and having a pivot axis coaxial with the first push arm pivot axis;

said first and second push arms being rigidly affixed to the blade such that the blade will pivot only about the pivot axes of the push arms;

a removable wear plate attached along the lower edge of the blade and forming a scraping edge, the wear plate and a lower portion of the blade extending forwardly and downwardly relative to vertical;

said support frame including an elongated base member extending orthogonally between the panels with said push arms pivotally connected thereto;

means on the base member for maintaining the orthogonal orientation of the base member relative to the panels as the drive means drives the blade a length of the table from end to end;

said means for maintaining the orthogonal orientation of the base member including:

a first leg mounted on a first end of the base member and projecting forwardly therefrom orthogonal to the base member;

a second leg mounted on a second end of the base member and projecting forwardly therefrom parallel to the first leg;

a first guide rail mounted on one of said panels and extending the length of the panel;

a second guide rail mounted on the other of said panels and extending the length of the panel;

first follower means on the first leg for following the first guide rail; and second follower means on the second leg for following the second guide rail.

2. The apparatus of claim 1:

wherein the first follower means includes at least an upper and a lower rotatable wheel mounted on the first leg and positioned above and below the first guide rail respectively, and in rotatable engagement therewith to prevent vertical movement but permit forward and rearward movement of the leg along the first guide rail; and wherein the second follower means includes at least an upper and lower rotatable wheel mounted on the second leg and positioned above and below the second guide rail, respectively, and in rotatable engagement therewith to prevent vertical movement but permit forward and rearward movement of the second leg along the second guide rail.

3. The apparatus of claim 2:

wherein the first follower means includes a third wheel rotatably mounted on a vertical axis and positioned inwardly of and in engagement with the first guide rail; and wherein the second follower means includes a third wheel rotatably mounted on a vertical axis and positioned inwardly of and in engagement with the second guide rail;

said first and second follower means third wheels positioned to prevent transverse horizontal movement of the frame but permit forward and rearward movement along the guide rails.

4. The apparatus of claim 3:

wherein the first follower means includes at least a pair of upper wheels positioned at forward and rearward ends of the first leg, and wherein the lower wheel is positioned generally midway between the upper wheels; and wherein the second follower means includes at least a pair of upper wheels positioned at forward and rearward ends of the second leg, and wherein the lower wheel is positioned generally midway between the upper wheels.

5. The apparatus of claim 4, wherein said drive means includes:

a drive shaft connected at a first end to the first follower means lower wheel, for selectively rotating the lower wheel; and a motor mounted on the frame and connected to the drive shaft for selectively rotating the drive shaft.

6. The apparatus of claim 5, wherein said drive shaft is mounted orthogonal to the frame legs and has a second end connected to the second follower means lower wheel, for selectively rotating both follower means lower wheels simultaneously.

7. The apparatus of claim 6, wherein said first and second guide rails have a plurality of teeth formed along a lower surface thereof, forming a rack on each of the guide rails, and wherein each follower means lower wheel is a pinion gear which engages the rack of the associated first and second guide rails.

8. Apparatus for removing slag from beneath a flame cutting table, the table having a pair of parallel, spaced apart vertical panels extending horizontally from a forward end to a rearward end, with a plurality of spaced apart slats mounted transversely along upper edges of the panels, comprising:

a generally vertically oriented blade having upper and lower edges, opposing vertical side edges, a forward pushing surface, and a rearward surface, said blade positioned beneath the table slats and between the panels;

drive means connected to the blade for driving the blade between the rearward and forward ends of the table;

a first elongated push arm connected at a forward end to the rearward surface of the blade, and said drive means being connected to a rearward end of the push arm;

said drive means being mounted on a support frame, and the rearward end of the push arm being pivotally connected to the support frame for pivotal movement about a pivot axis parallel to the blade and orthogonal to the panels;

a second push arm connected at a forward end to the blade and pivotally connected at a rearward end to the support frame, said second push arm parallel and spaced apart from the first push arm and having a pivot axis coaxial with the first push arm pivot axis;

said frame including an elongated base member extending orthogonally between the panels with said push arms pivotally connected thereto; and means on the base member for maintaining the orthogonal orientation of the base member relative to the panels as the drive means drives the blade a length of the table from end to end;

said means for maintaining the orthogonal orientation of the base member including:

a first leg mounted on a first end of the base member and projecting forwardly therefrom orthogonal to the base member;

a second leg mounted on a second end of the base member and projecting forwardly therefrom parallel to the first leg;

a first guide rail mounted on one of said panels and extending the length of the panel;

a second guide rail mounted on the other of said panels and extending the length of the panel;

first follower means on the first leg for following the first guide rail; and second follower means on the second leg for following the second guide rail.

9. The apparatus of claim 8:

wherein the first follower means includes at least an upper and a lower rotatable wheel mounted on the first leg and positioned above and below the first guide rail respectively, and in rotatable engagement therewith to prevent vertical movement but permit forward and rearward movement of the leg along the first guide rail; and wherein the second follower means includes at least an upper and lower rotatable wheel mounted on the second leg and positioned above and below the second guide rail, respectively, and in rotatable engagement therewith to prevent vertical movement but permit forward and rearward movement of the second leg along the second guide rail.

10. The apparatus of claim 9:

wherein the first follower means includes a third wheel rotatably mounted on a vertical axis and positioned inwardly of and in engagement with the first guide rail; and wherein the second follower means includes a third wheel rotatably mounted on a vertical axis and positioned inwardly of and in engagement with the second guide rail;

said first and second follower means third wheels positioned to prevent transverse horizontal movement of the frame but permit forward and rearward movement along the guide rails.

11. The apparatus of claim 9:

wherein the first follower means includes at least a pair of upper wheels positioned at forward and rearward ends of the first leg, and wherein the lower wheel is positioned generally midway between the upper wheels; and wherein the second follower means includes at least a pair of upper wheels positioned at forward and rearward ends of the second leg, and wherein the lower wheel is positioned generally midway between the upper wheels.

12. The apparatus of claim 9, wherein said drive means includes:

a drive shaft connected at a first end to the first follower means lower wheel, for selectively rotating the lower wheel; and a motor mounted on the frame and connected to the drive shaft for selectively rotating the drive shaft.

13. The apparatus of claim 12, wherein said drive shaft is mounted orthogonal to the frame legs and has a second end connected to the second follower means lower wheel, for selectively rotating both follower means lower wheels simultaneously.

14. The apparatus of claim 12, wherein said first and second guide rails have a plurality of teeth formed along a lower surface thereof, forming a rack on each of the guide rails, and wherein each follower means lower wheel is a pinion gear which engages the rack of the associated first and second guide rails.

15. A burn table with slat removal apparatus, comprising:

a pair of parallel, spaced apart vertically oriented panels extending longitudinally and horizontally from forward to rearward ends;

a plurality of spaced apart slats mounted transversely along upper edges of the panels;

a generally vertically oriented blade having upper and lower edges, opposing vertical side edges, a forward pushing surface, and a rearward surface, said blade positioned beneath the table slats and between the panels;

a first elongated push arm connected at a forward end to the rearward surface of the blade;

drive means connected to a rearward end of the push arm for driving the blade between the rearward and forward ends of the table;

said drive means being mounted on a support frame;

the rearward end of the push arm being pivotally connected to the support frame for pivot movement about a pivot axis parallel to the blade and orthogonal to the panels;

a second push arm connected at a forward end to the blade and pivotally connected at a rearward end to the support frame, said second push arm parallel and spaced apart from the first push arm and having a pivot axis coaxial with the first push arm pivot axis;

said frame including an elongated base member extending orthogonally between the panels, said push arms pivotally connected thereto, and means on the base member for maintaining the orthogonal orientation of the base member relative to the panels as the drive means drives the blade a length of the table from end to end.

16. The burn table of claim 15, wherein said means for maintaining the orthogonal orientation of the base member includes:

a first leg mounted on a first end of the base member and projecting forwardly therefrom orthogonal to the base member;

a second leg mounted on a second end of the base member and projecting forwardly therefrom parallel to the first leg;

a first guide rail mounted on one of said panels and extending the length of the panel;

a second guide rail mounted on the other of said panels and extending the length of the panel;

first follower means on the first leg for following the first guide rail; and second follower means on the second leg for following the second guide rail.

17. The burn table of claim 16:

wherein the first follower means includes at least an upper and a lower rotatable wheel mounted on the first leg and positioned above and below the first guide rail respectively, and in rotatable engagement therewith to prevent vertical movement but permit forward and rearward movement of the leg along the first guide rail; and wherein the second follower means includes at least an upper and lower rotatable wheel mounted on the second leg and positioned above and below the second guide rail, respectively, and in rotatable engagement therewith to prevent vertical movement but permit forward and rearward movement of the second leg along the second guide rail.

18. The burn table of claim 17:

wherein the first follower means includes a third wheel rotatably mounted on a vertical axis and positioned inwardly of and in engagement with the first guide rail; and wherein the second follower means includes a third wheel rotatably mounted on a vertical axis and positioned inwardly of and in engagement with the second guide rail;

said first and second follower means third wheels positioned to prevent transverse horizontal movement of the frame but permit forward and rearward movement along the guide rails.

19. The burn table of claim 17:

wherein the first follower means includes at least a pair of upper wheels positioned at forward and rearward ends of the first leg, and wherein the lower wheel is positioned generally midway between the upper wheels; and wherein the second follower means includes at least a pair of upper wheels positioned at forward and rearward ends of the second leg, and wherein the lower wheel is positioned generally midway between the upper wheels.

20. The burn table of claim 17, wherein said drive means includes:

a drive shaft connected at a first end to the first follower means lower wheel, for selectively rotating the lower wheel; and a motor mounted on the frame and connected to the drive shaft for selectively rotating the drive shaft.

21. The burn table of claim 20, wherein said drive shaft is mounted orthogonal to the frame legs and has a second end connected to the second follower means lower wheel, for selectively rotating both follower means lower wheels simultaneously.

22. The burn table of claim 20, wherein said first and second guide rails have a plurality of teeth formed along a lower surface thereof, forming a rack on each of the guide rails, and wherein each follower means lower wheel is a pinion gear which engages the rack of the associated first and second guide rails.

23. Apparatus for removing slag from beneath a flame cutting table, the table having a pair of parallel, spaced apart vertical panels extending horizontally from a forward end to a rearward end, with a plurality of spaced apart slats mounted transversely along upper edges of the panels, comprising:

a generally vertically oriented blade having upper and lower edges, opposing vertical side edges, a forward pushing surface, and a rearward surface, said blade positioned beneath the table slats and between the panels;

drive means connected to the blade for driving the blade between the rearward and forward ends of the table;

said drive means being mounted on a support frame, and wherein the blade is mounted along a forward edge of the frame and depends form the frame with a lower generally horizontal edge for contacting a floor surface to scrape the floor surface clean of slag.

24. The apparatus of claim 23:

wherein the blade has a pair of vertically oriented cylinders mounted thereon, with length adjustable pistons projecting upwardly therefrom;

wherein upper ends of the pistons are connected to the frame to permit vertical movement of the blade relative to the frame; and further comprising biasing means connected between the pistons and cylinders for biasing the blade downwardly away from the frame.

25. The apparatus of claim 23, further comprising:

a wear plate operably mounted on the lower edge of the blade for vertical movement relative to the blade;

said wear plate having a lower scraper edge projecting downwardly beyond the lower edge of the blade, to contact a floor surface; and biasing means connected between the wear plate and the blade for biasing the wear plate downwardly relative to the blade.

26. The apparatus of claim 23, further comprising:

a wear plate pivotally mounted along the lower edge of the blade for pivotal movement along a horizontal axis along the lower edge of the blade; and biasing means connected between the wear plate and the blade for biasing the plate to pivot rearwardly about its pivot axis.

* * * * *